US006634940B2

(12) United States Patent
Yoshida et al.

(10) Patent No.: US 6,634,940 B2
(45) Date of Patent: Oct. 21, 2003

(54) PRIZE ACQUISITION GAME MACHINE AND IT'S PRIZE

(75) Inventors: Masato Yoshida, Kyoto (JP); Koki Imai, Kyoto (JP)

(73) Assignee: Omron Corporation (JP)

(*) Notice: Subject to any disclaimer, the term of this patent is extended or adjusted under 35 U.S.C. 154(b) by 0 days.

(21) Appl. No.: 09/968,954

(22) Filed: Oct. 3, 2001

(65) Prior Publication Data

US 2002/0067002 A1 Jun. 6, 2002

(30) Foreign Application Priority Data

Oct. 6, 2000 (JP) ....................................... 2000-307502

(51) Int. Cl.$^{7}$ ................................................ A63F 13/00

(52) U.S. Cl. .............................. 463/7; 463/16; 463/38; 463/46; 273/440; 273/447; 273/448; 273/139; 221/210

(58) Field of Search ................................ 273/440, 447, 273/448, 453, 454, 459, 461; 221/209, 210, 220, 221, 224; 463/1, 7, 9, 10, 36–38

(56) References Cited

U.S. PATENT DOCUMENTS 5,271,628 A * 12/1993 Okada ........................ 273/448
5,397,134 A * 3/1995 Fishman et al. .............. 463/25
5,799,940 A * 9/1998 Tripp ..................... 273/144 R
5,967,892 A * 10/1999 Shoemaker, Jr. ............... 463/7
6,139,429 A * 10/2000 Shoemaker, Jr. ............... 463/7
6,209,868 B1 * 4/2001 Norton ................... 273/118 R
6,315,665 B1 * 11/2001 Faith ........................... 463/23

* cited by examiner

*Primary Examiner*—S. Thomas Hughes
*Assistant Examiner*—Alex F.R.P. Rada, II
(74) *Attorney, Agent, or Firm*—Dickstein Shapiro Morin & Oshinsky LLP

(57) ABSTRACT

In a game machine for causing exhibited prizes such as stuffed toys to be acquired with game characteristics, the reliability of the game machine can be ensured, and a new game characteristic can be obtained. A prize acquisition game machine includes a prize exhibit portion for exhibiting a plurality of prizes provided with ID tags 3*a* having machine readable arbitrary identification marks, a prize selection unit for selecting desired prizes from the prize exhibit portion, an ID tag reading device 16 for reading the identification marks from the ID tags of the prizes selected by the prize selection unit, a judgement unit (e.g., a CPU) for comparing and judging whether or not the identification marks of the plurality of prizes selected by the prize selection unit 4 are identical to each other, and a control portion (e.g., a CPU) for driving a prize release unit in a case where a judgement result of the judgement means is YES, to release the plurality of prizes.

13 Claims, 9 Drawing Sheets

PRIZE ACQUISITION GAME MACHINE AND IT'S PRIZE

BACKGROUND OF THE INVENTION

1. Field of the Invention

The present invention relates to a prize acquisition game machine in which prizes, for example, stuffed toys or dolls are exhibited and are acquired under predetermined conditions, and its prize.

2. Description of the Related Art

In some of the prize acquisition game machines as set forth above, a desired prize is caught among prizes piled up in a container box with an open top by using a pinching means, such as a crane, operated through buttons or the like. However, if anyone can easily obtain the prize, there is no game characteristic, and therefore, the pinching means is devised and various conditions of the pinching means are set so that a pinch is made when the prize is pulled up, or if the way of seizing the prize is insufficient, the prize can fall during the transfer.

In such a game machine, the fun of the game is related to whether or not the prize can be caught, and an operator (game center) of the game machine can enter anything that seems to be a prize which a player desires. If a prize unsuitable for the game machine is entered, there is a disadvantage that it deviates from the function and role as the game machine. Additionally, there is a chance of damaging the machine.

SUMMARY OF THE INVENTION

An object of the present invention is therefore to enable a game machine to restrict prizes to be entered so that the reliability as the game machine can be kept, and further, to enable the game machine to have a new game characteristic.

In order to achieve the object, a prize acquisition game machine for causing exhibited prizes to be acquired is characterized by comprising a prize exhibit portion for exhibiting a plurality of prizes having machine readable arbitrary identification marks, prize selection means for selecting a desired prize from the prize exhibit portion, a reading device for reading the identification mark of the prize selected by the prize selection means, judgement means for comparing and judging whether or not the identification mark of the prize selected by the prize selection means has a predetermined relation to a set value, and a control portion for driving prize release means in a case where a judgement result of the judgement means is the predetermined relation, to release plural prizes selected by the prize selection means.

That is, in the prize acquisition game machine, the prizes to be acquired are exhibited in the prize exhibit portion, and a desired prize is selected by the prize selection means among the prizes in the prize exhibit portion. Since the selected prize has the identification mark, the identification mark is read by the reading device. Then, the judgement means compares and judges whether or not the identification mark of the prize has the predetermined relation to the set value. If the judgement result is the predetermined relation, the control portion drives the prize release means, the plural selected prizes having the identification marks of the predetermined relation are released, so that the prizes are caused to be acquired. If the judgement result is not the predetermined relation, the selected prize may be withdrawn, that is, returned to the prize exhibit portion or separately collected.

The identification mark can be attached by using, for example, an ID tag or a bar code.

The set value is, for example, an arbitrary identification mark previously determined by the control portion, an identification mark of a former selected prize in a case where a plurality of prizes are selected in sequence, or an identification mark of any prize in a case where a plurality of prizes are simultaneously selected.

That the identification mark has the predetermined relation means such a suitable relation that in a case where the identification mark is, for example, a figure, a mark of cards, a suitable pattern, a letter, a character, or the like, the identification marks are identical to each other, or in a case where identification marks are systematic, they satisfy the sequence.

That is, in this game machine, if a prize is not provided with an ID tag, it can not be entered as a prize. In other words, prizes to be entered can be restricted, and by this, the reliability of the game machine can be ensured.

Besides, an operation technique of a crane as described in the prior art is not made to have a game characteristic, but the point whether the relation of intrinsic identification marks of a plurality of visually selected prizes meet the predetermined relation can be made to have a new game characteristic. Further, in the case where the plurality of prizes are selected and the identification marks of the prizes are judged, the plurality of prizes, not one as in the prior art, can be acquired all at once, so that the game characteristic is further raised.

An agitation means for agitating the prizes in the prize exhibit portion may be provided in the vicinity of the prize exhibit portion. The agitation means is driven at a previously set time or in accordance with a request of a player. By the driving, the prizes in the prize exhibit portion are agitated, and the positions of the prizes are moved, which makes it possible to easily select a desired prize.

The prize exhibit portion may be formed into, for example, a box with an open top, which contains the prizes at random, and the prize selection means may be constructed by a pinching means operated by an operation means to catch a desired prize. The operation means comprises, for example, a button or a lever is operated so that the desired prize can be selected and acquired among the prize group piled up. In this case, the pinching means may be constructed so that a catching rate of the prize becomes high. For example, drive control is made such that when the pinching means is lowered, it catches the prize strongly, and the structure of the pinching means is made such that for example, rubber to prevent slipping is attached to a pinching portion so that the prize does not fall during the transfer.

When the construction is made in this way, a high game characteristic can be obtained by the fun of selecting a desired prize and a sense of expectation as to whether the desired prize can be really caught.

The prize exhibit portion may be constructed, for example, by a plurality of panels with the prizes respectively mounted on the panels. A desired prize is selected by specifying a specific panel. The structure of the prize selection means is simple, and selection of the prize can be simply made, so that the game machine may be played in a short time. According to the way of selection, a game like the concentration as one of card games can also be realized, and a quite new type game machine can be obtained as the prize acquisition game machine.

The prize selection means can be constructed by pushing the prize from the prize exhibit portion, or by dropping the prize from the prize exhibit portion.

Additionally, in the game machine of the invention, a prize mount stand on which the selected prize is mounted may be formed, and a display unit for displaying the identification mark read by the reading device may be provided in the vicinity of the prize mount stand. The selected prizes can be separately mounted to become noticeable, so that a desire for the prizes can be intensified, and the game characteristic can be raised. Since the identification mark of the selected prize can be known by displaying the identification mark on the display unit, in the case where a plurality of prizes are selected in sequence, it is possible to notify a player that a prize of which identification mark must be taken at next prize selection, so that hopes and expectations are raised, and a game feeling can be enjoyed. By making the display of the display unit produce a sense of expectation, the game characteristic can be further raised.

A result display unit for displaying the judgement result of the judgement means may be provided. Since the judgement result is displayed, the result can be definitely notified, and it is also possible to provide fun by using sound and light.

A specification display unit for displaying the numbers of the prizes for the respective identification marks of the prizes in the prize exhibit portion may be provided. On the specification display unit, a display is carried out before a start of a game, or in the case where the game machine is structured such that a plurality of prizes are selected in sequence, a display is carried out in the middle of selection of the prizes (for example, in the case where selection is made twice, after the first selection is made). By the display, the player can imagine an approximate acquisition probability, and he can feel a sense of expectation to the game, or can enjoy unexpected luck.

According to another aspect, the invention is characterized by a prize exhibited in the prize exhibit portion of the prize acquisition game machine as described above. That is, the prize is provided with an ID tag having an arbitrary identification mark, and this prize is entered in the prize exhibit portion of the prize acquisition game machine, so that the game machine having high reliability can be obtained.

DETAILED DESCRIPTION OF THE PREFERRED EMBODIMENTS

An embodiment of the present invention will be described below with reference to the drawings.

Figure 1:
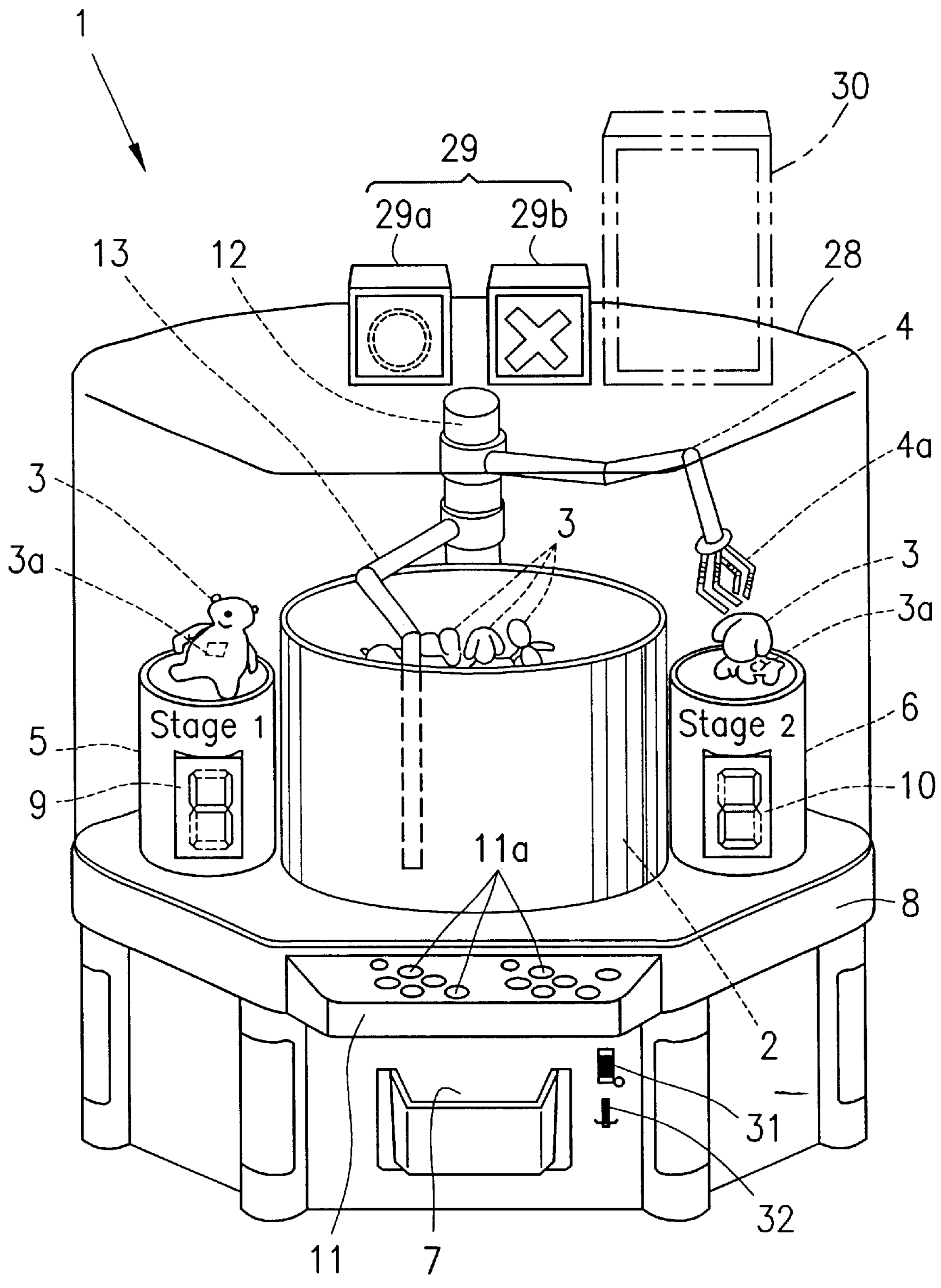
FIG. 1 is a perspective view of a prize acquisition game machine.

FIG. 1 is a perspective view of a prize acquisition game machine 1 (hereinafter referred to as a game machine). FIG. 1 shows the game machine in a state where a game is ended.

The game machine 1 constructed such that two desired prizes 3, 3 are selected in sequence by prize selection means 4 among the prizes 3 contained in a prize exhibit portion 2 at random. The prizes 3, 3 are respectively mounted on prize mount stands 5, 6. If the identification marks of ID tags 3*a* incorporated in the prizes are identical to each other, the two prizes 3, 3 are released to a prize release port 7.

The prize exhibit portion 2 has a transparent cylindrical box shape having an open top, and is installed at the center of the top of a table-shaped game machine support 8. Many prizes 3 including the built-in ID tags 3*a* having figures of "1" to "6" as an example of the arbitrary identification marks are contained in the prize exhibit portion 2 in a pileup state. Incidentally, the ID tag 3*a* is a non-contact type information recording medium and is made of a well-known structure, information is stored in the inside storage circuit, and readout and writing of information can be performed in a non-contact state.

Cylindrical prize mount stands 5 and 6 are provided at both sides of the prize exhibit portion 2, one (e.g., left) of the prize mount stands is made the first prize mount stand 5, and the other (e.g., right) of the prize mount stands is made the second prize mount stand 6. Display units 9 and 10 made of electric light display units or the like are provided at the front of the prize mount stands 5 and 6, the display unit of the first prize mount stand 5 is made the first display unit 9, and the display unit of the second prize mount stand 6 is made the second display unit 10.

Although the prizes 3 selected by the player from the prize exhibit portion 2 are put on the prize mount stands 5 and 6, this is not carried out simultaneously as described above, but is carried out in sequence. The operation of selecting and mounting the prize 3 is carried out by the one prize selection means 4. The prize selection means 4 is constructed by well-known pinching means for catching a desired prize, and in this example, it is constructed by a crane having a plurality of joints and a pinching portion 4*a* at its tip end. This crane is driven and controlled such that for example, after the pinching portion 4*a* at the tip end is moved horizontally and vertically, it automatically falls and seizes a prize, and after pulling up, it automatically put the prize on the prize mount stand 5, 6 and releases it. The operation of the crane is carried out by operation switches 11*a* on an operation panel 11 provided at the front of the game machine support 8.

Incidentally, in order to reliably catch and hold the prize 3 during the transfer, the crane is driven and controlled such that it stops once at the end of falling, not at the rising, and strongly closes the pinching portion 4*a*, and if necessary, the structure of the pinching portion 4*a* is made unslippery by fitting rubber or the like.

An agitation means 13 for agitating the prizes 3 in the prize exhibit portion 2 is provided at the lower side of the crane at a post 12 for supporting the crane. This agitation means 13 also has a well-known structure having a plurality of joints similarly to the above crane, and is driven by the operation of the operation switches 11*a*.

Mount confirmation sensors 14 and 15 constructed by, for example, photoelectronic sensors are provided at upper end portions of the prize mount stands 5 and 6 in order to judge whether or not the prizes 3 are mounted by the crane. The mount confirmation sensor of the first mount stand 5 is made the first mount confirmation sensor 14, and the mount confirmation sensor of the second mount stand 6 is made the second mount confirmation sensor 15.

Figure 2:
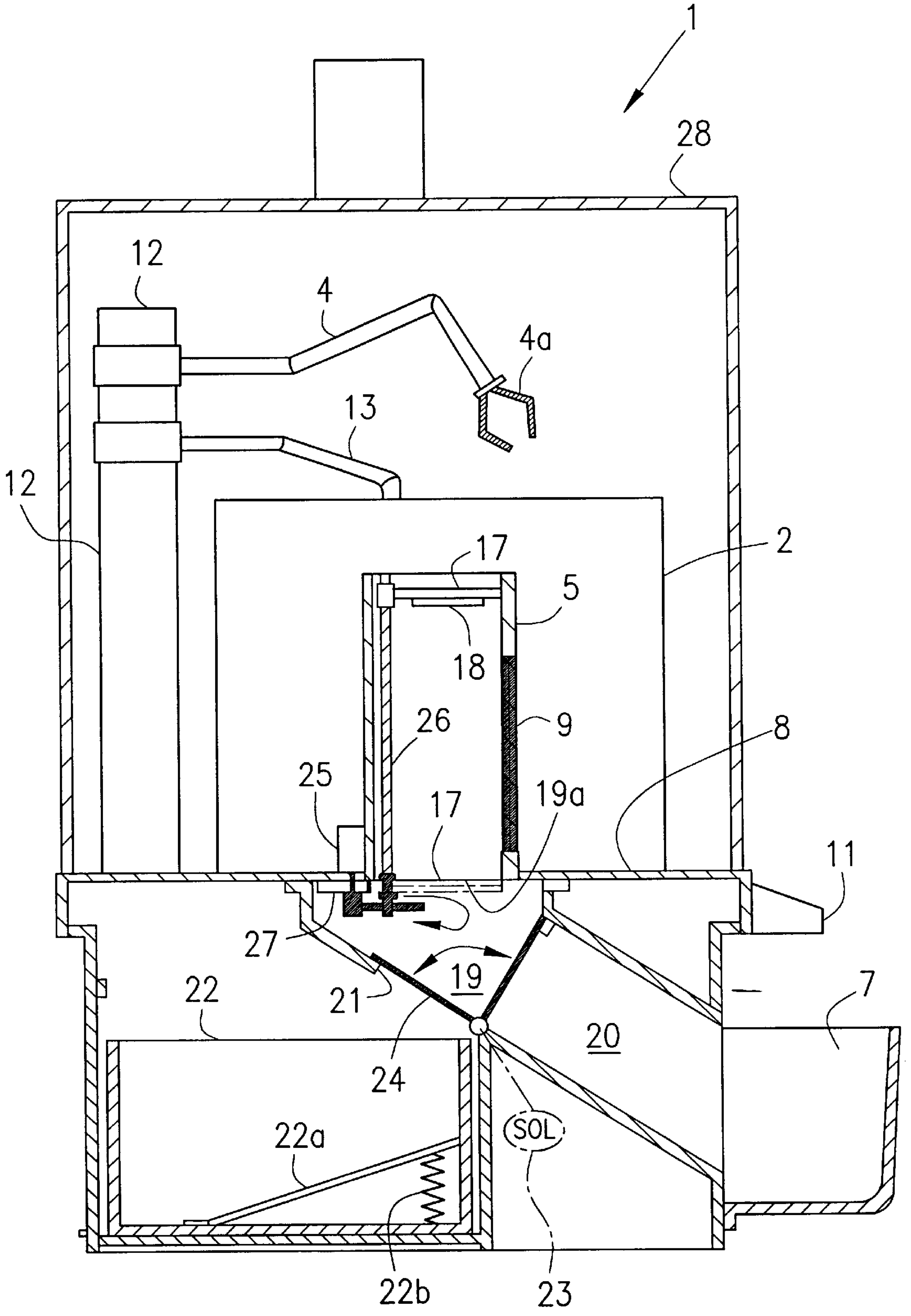
FIG. 2 is a sectional view of the prize acquisition game machine.

The respective prize mount stands 5 and 6 are provided with ID tag reading devices 16. As shown in FIG. 2, the ID tag reading devices 16 is constructed by an antenna coil 18 attached to the lower surface of a support plate 17 moving vertically in the prize mount stand 5, 6, and a circuit device (not shown) attached to its vicinity, and the identification mark stored in the ID tag 3*a* is read in a non-contact state.

A discharge structure for releasing or collecting the mount prize 3 after the game is ended is formed at the prize mount stand 5, 6 as shown in FIG. 2. That is, the support plate 17 moving vertically by a screw feed to a drop space 19 formed at the lower portion of the prize mount stand 5, 6 is provided in the cylindrical prize mount stand 5, 6, and a prize release path 20 is formed forward from the drop space 19, which communicates with a prize takeout port 7. A prize collection port 21 is formed rearward from the drop space 19, and a separate collection box 22 is provided below the prize collection port 21 in a state where it can be freely drawn in and out. A slant plate 22*a* which ascends toward the depth side is provided at the inner bottom portion of the collection box 22, and is pushed upward by a coil spring 22*b*, so that the collected prizes can be uniformly collected. A distributing plate 24 driven by a solenoid 23 is provided at a boundary portion between the prize release path 20 and the prize collection port 21.

The collection may be carried out in such a way as to return the prizes to the prize exhibit portion 2, not as to collect them into the collection box 22 as described above. In this case, for example, the prize mount stands 5 and 6 are formed to be higher that the prize exhibit portion 2, the upper ends of the prize mount stands 5 and 6 are coupled to the end of the prize exhibit portion 2 by slides, and extrusion means using a solenoid or the like, for extruding the prizes 3 to the prize exhibit portion 2 may be disposed at the upper end portions of the prize mount stands 5 and 6. In the case where a rare article or the like is entered as the prize 3, re-challenge can be encouraged.

The screw feed is carried out by using a motor 25 rotating normally and reversely, and the prize 3 on the support plate 17 is dropped into the drop space 19 when the support plate 17 having reached the lower end of the feed screw 26 is further rotated. That is, since it is not necessary that the feed screw 26 is rotated in the left direction seen on the plane in order to make the support plate 17 go down, when setting is made so that the support plate 17 is positioned at the lower end of the feed screw 26 at a stage where it reaches the lower end of the inner peripheral surface of the prize mount stand 5, 6, the support plate 17 which stops relative rotation, together with the feed screw 26, rotates on the ceiling surface of the drop space 19 in the left direction seen on the plane. This rotation is controlled in a state where a drop port 19*a* is sufficiently opened, by a control piece 27 vertically provided from the ceiling surface of the drop space 19. When the support plate 17 is raised, the motor 25 has only to be reversely rotated, the support plate 17 rotating together is controlled by an extended portion of the other (left side seen on the plane) of the control panel piece 27, and the rotation is stopped at a position where it blocks the drop port 19*a*. Thus, the support plate 17 rises in the inside of the stand 5, 6 by further rotation of the feed screw 26. That is, since the opening/closing of the drop space 19*a* is performed by only the screw feeding, the structure is simple. The top of the game machine support 8 is covered with a transparent cover member 28 by which the prize exhibit portion 2 and the like are surrounded, and a result display unit 29 is fitted to the top of the cover member 28. The result display unit is constructed by a display unit support 29*a* displaying "O" and a display unit support 29*b* displaying "X".

Figure 3:
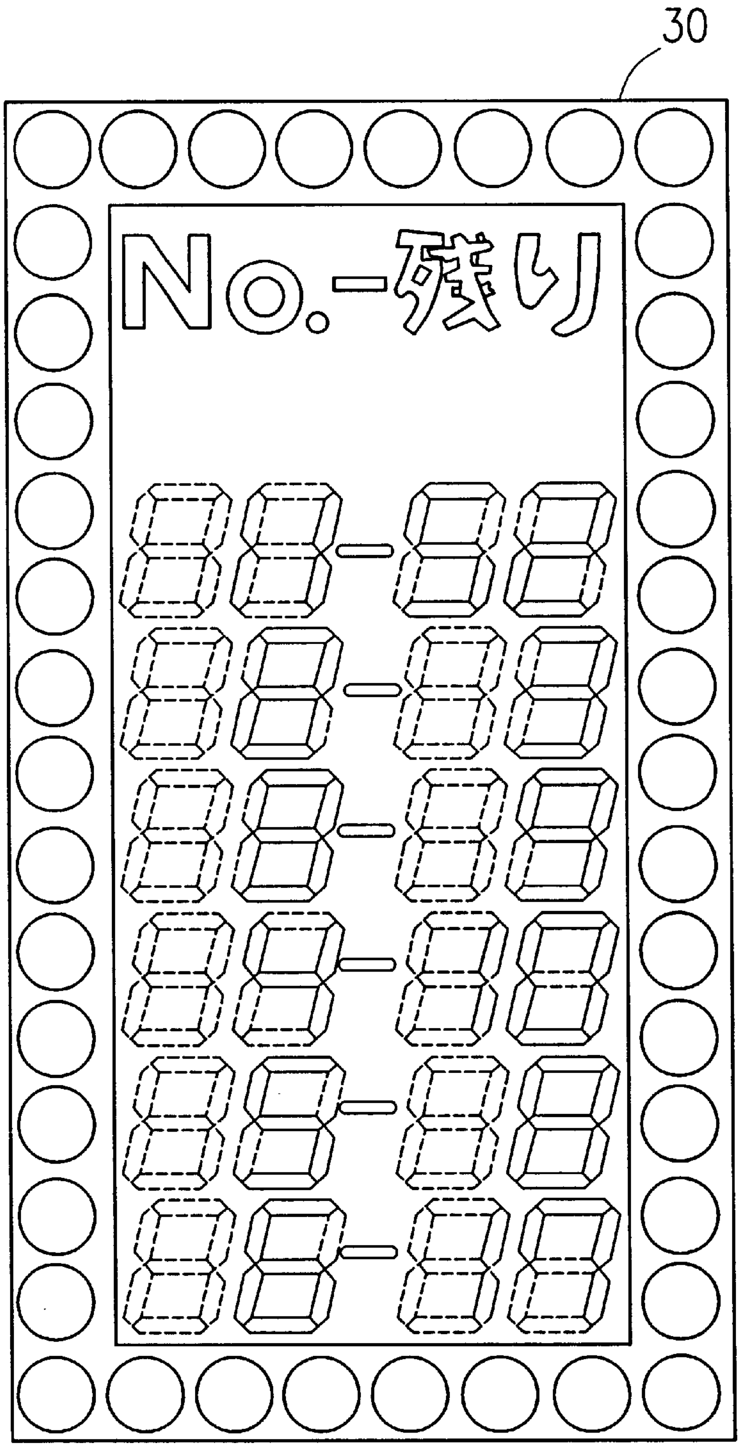
FIG. 3 is a front view of a specification display unit.

An optional specification display unit 30 (drawn using dashed lines in FIG. 1) may be attached. As shown in FIG. 3, the specification display unit 30 indicates the numbers of the prizes 3 including the ID tags 3*a* having the respective identification marks, and is constructed by an electric light display unit.

Incidentally, in FIG. 1, reference numeral 31 designates a coin slot in which a coin (metal money or medal) is inserted; and 32, a coin return port which is connected with a coin processing portion 33.

Figure 4:
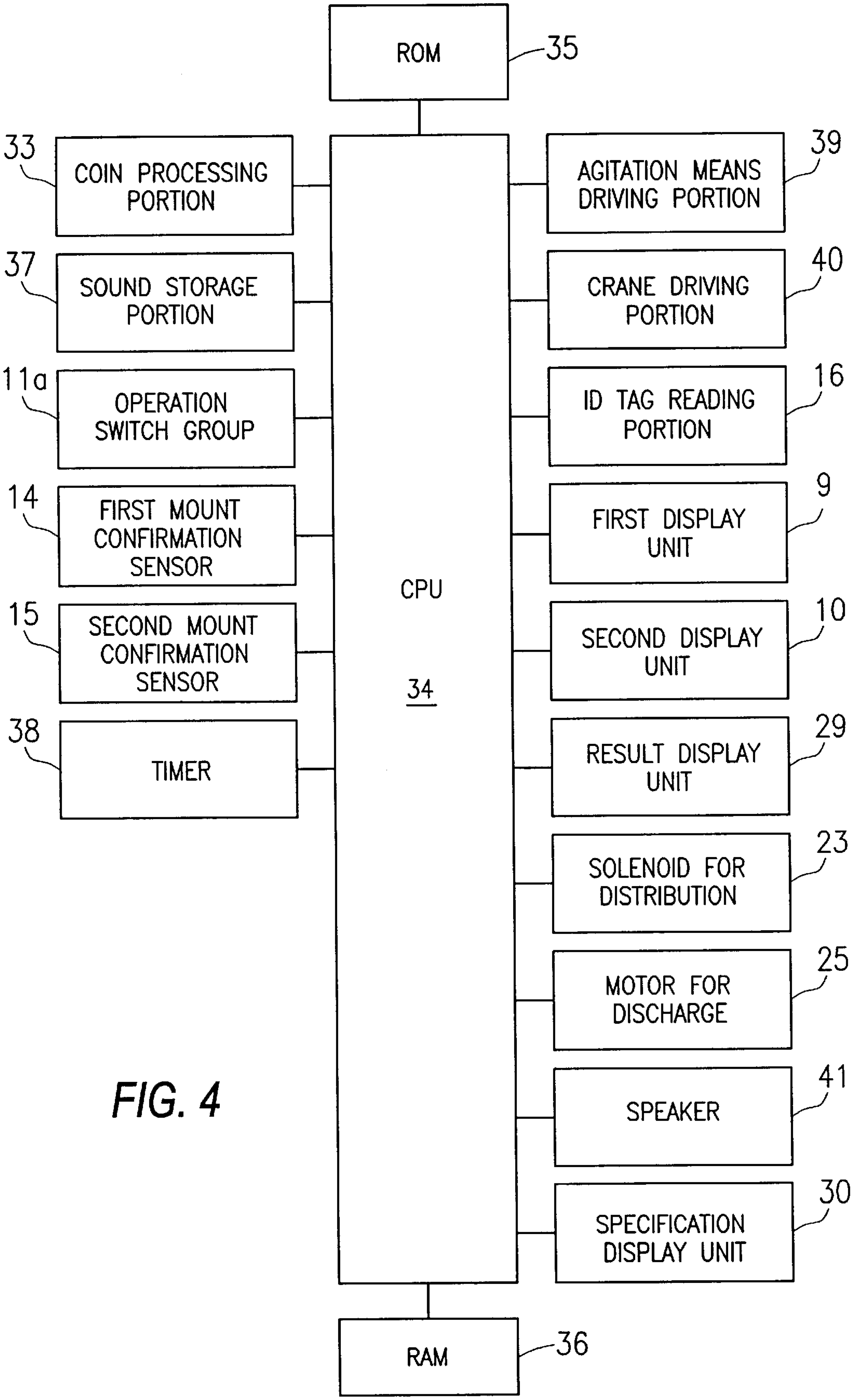
FIG. 4 is a block diagram of a control circuit.
Figure 5:
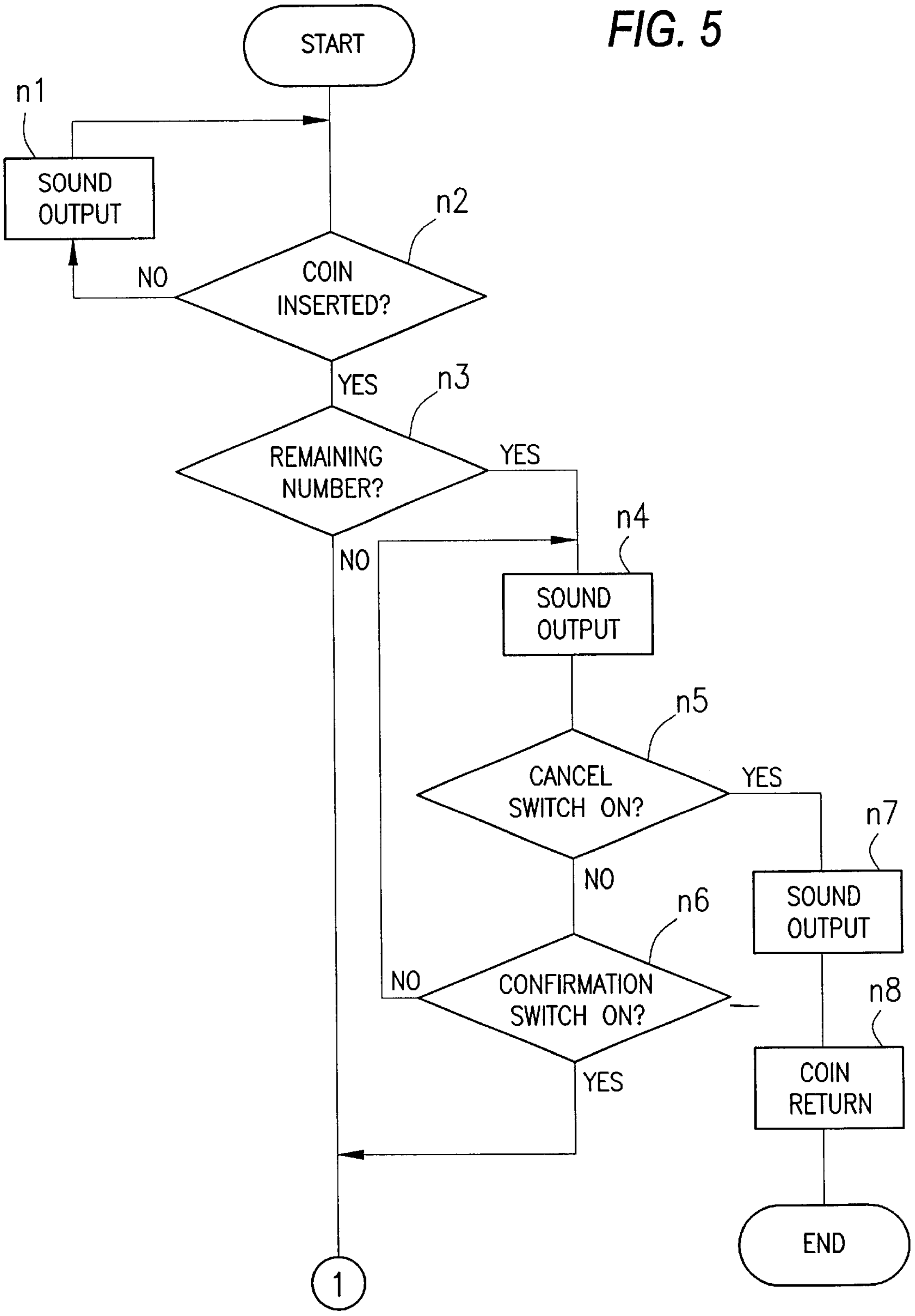
FIG. 5 is a flowchart of a game processing operation performed by a CPU.
Figure 6:
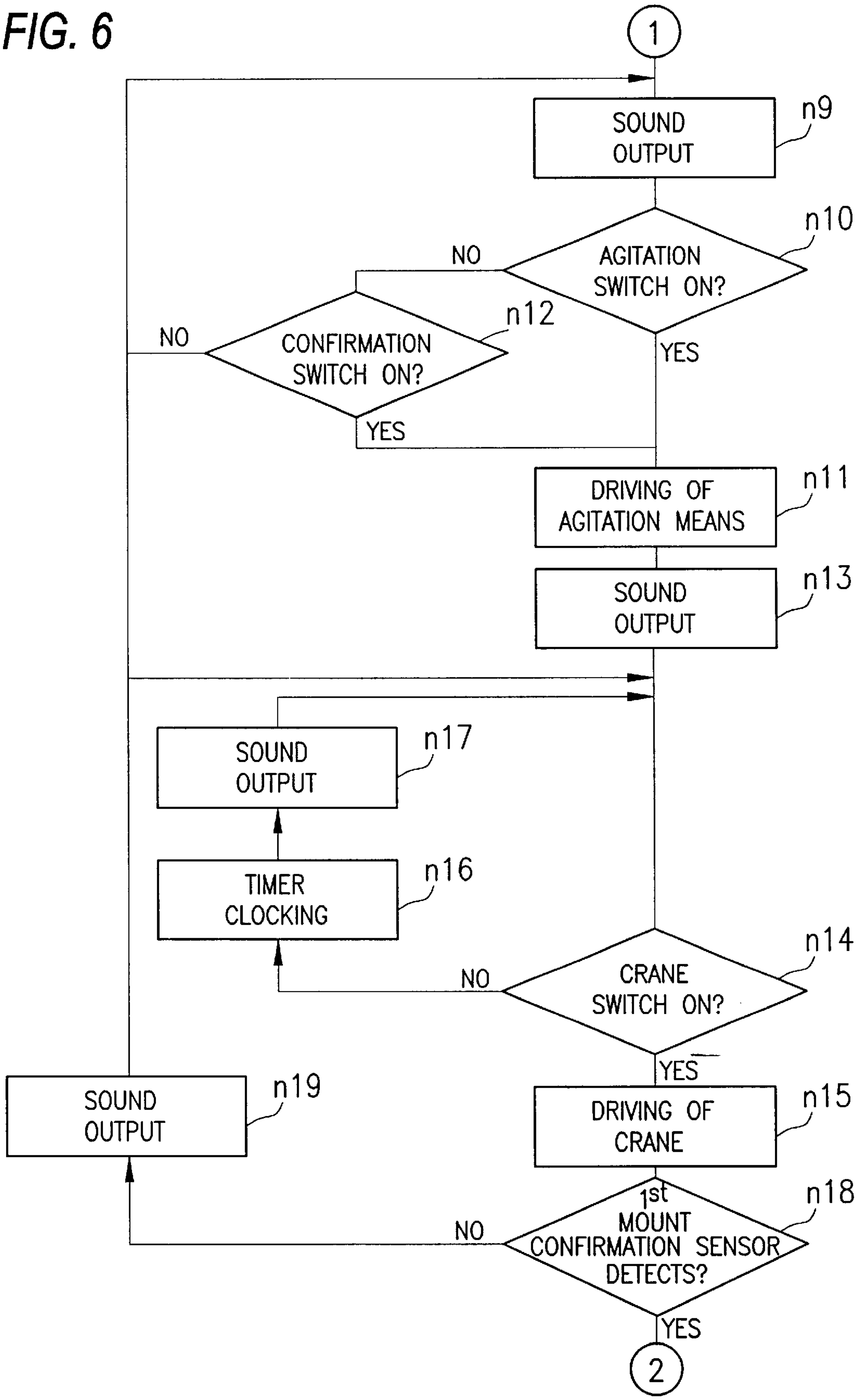
FIG. 6 is a flowchart of the game processing operation performed by the CPU.
Figure 7:
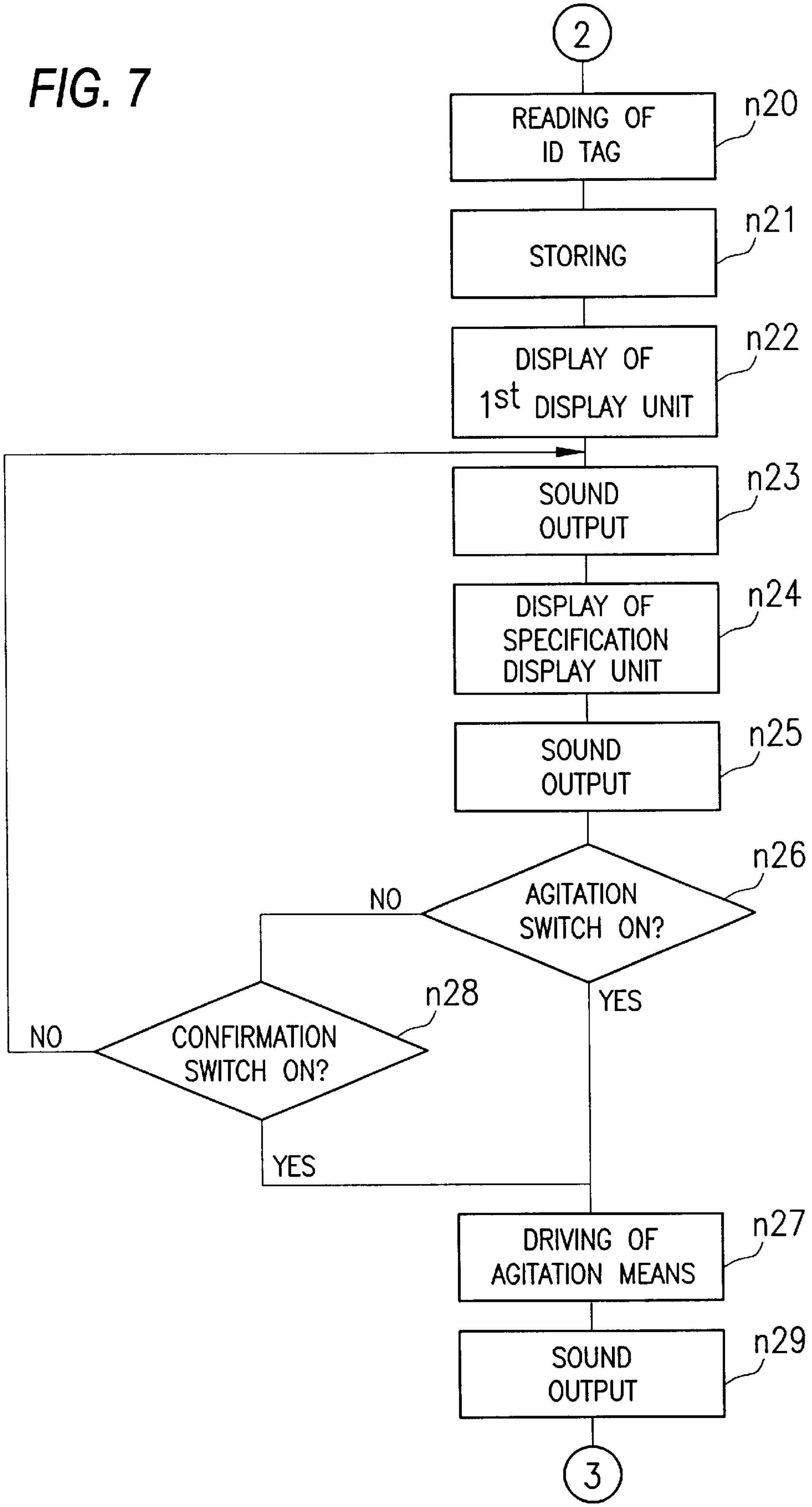
FIG. 7 is a flowchart of the game processing operation performed by the CPU.
Figure 8:
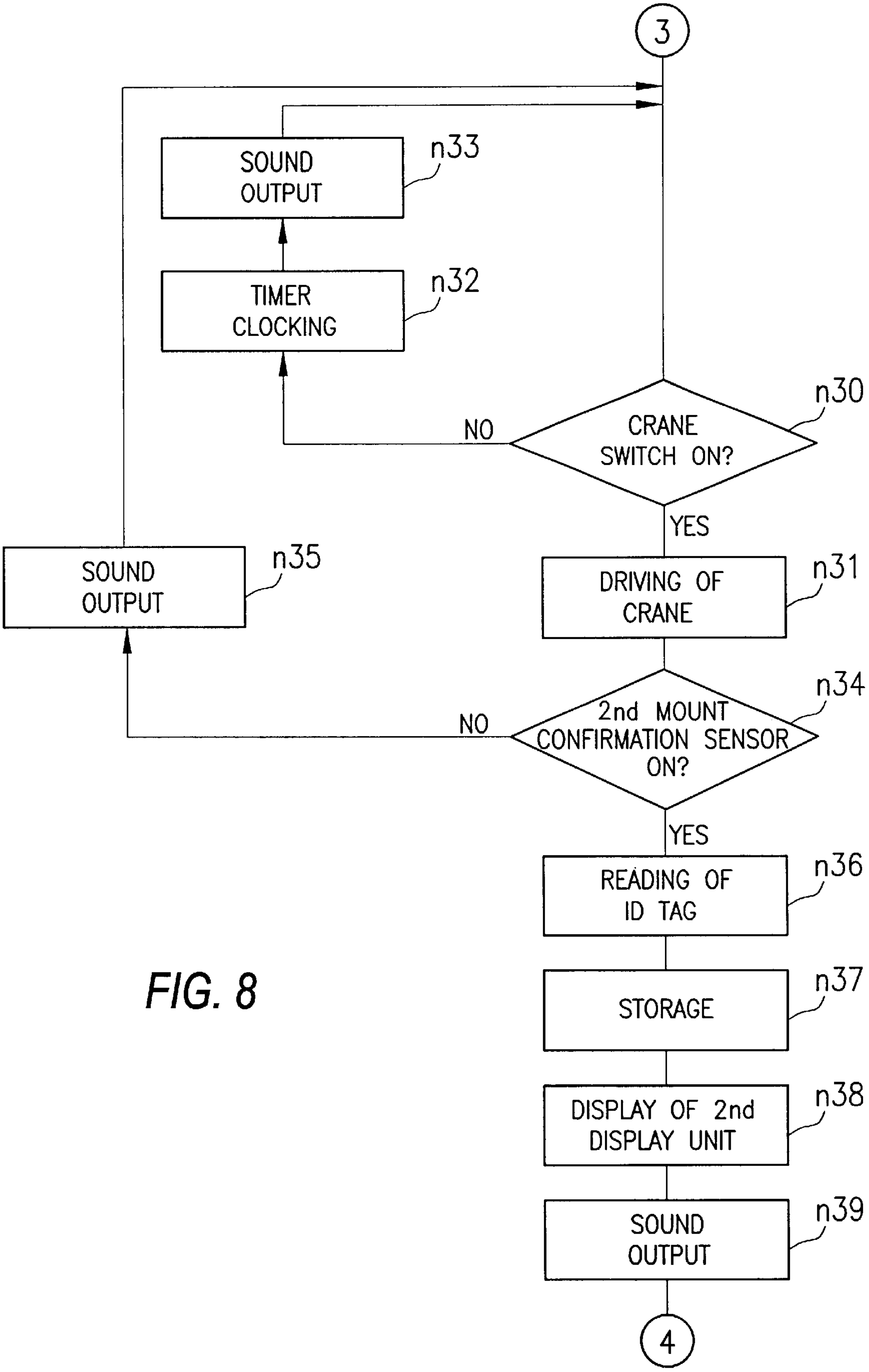
FIG. 8 is a flowchart of the game processing operation performed by the CPU.
Figure 9:
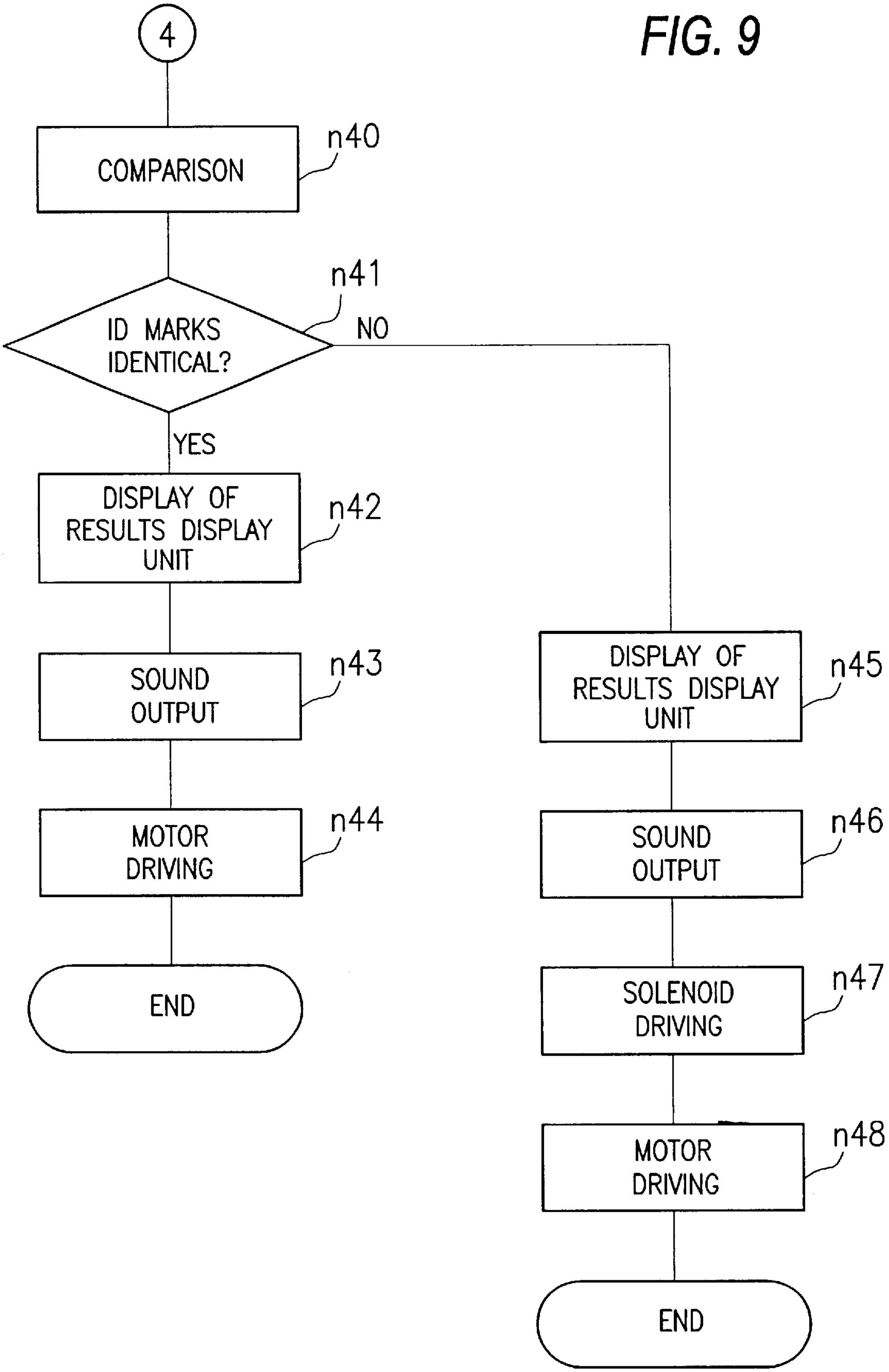
FIG. 9 is a flowchart of the game processing operation performed by the CPU.

FIG. 4 is a block diagram of a control circuit for driving a controlling the game machine 1 having the foregoing structural elements. A CPU 34 executes a control operation along a program stored in a ROM 35, and a RAM 36 stores necessary control data. A control portion made of the CPU 34, the ROM 35 and the RAM 36 is connected with a sound storage portion 37 for storing sounds such as an effect sound and explanatory sound, a timer 38 for clocking, a agitation means driving portion 39 for driving the agitation means, a crane driving portion 40 for driving the crane as the prize selection means 4, and a speaker 41 for generating the sounds stored in the sound storage portion 37.

The prizes 3 contained in the prize exhibit portion 2 having their numbers, including the ID tags 3*a* inputted to the RAM 35 via panel operation or the like and are stored in advance.

Hereinafter, a control operation of the game machine 1 will be described with reference to flowcharts of a game processing operation performed by the CPU shown in FIGS. 5 to 9.

First, the sound of the brief of the game or urging a player to play the game, stored in the sound storage portion 37 is provided from the speaker 41 (step n1). When a coin is inserted by the player (step n2), the CPU 34 reads the numbers for the respective identification marks as to the prizes 3 from the RAM 36, and judges whether or not the prize 3 with the remaining number "1" exists (step n3). The reason is that if the prize 3 with the remaining number "1" exists, in the case where the prize 3 with the remaining number "1" is first selected, there is no possibility to acquire the prize 3 in the game.

In the case where the prize with the remaining number "1" exists, the sound is outputted (step n1) to convey the above point, and causes the player to convey a judgement result by using the operation switches 11*a*. That is, the game is stopped by pressing a cancel switch (step n5), or the game is played by pressing a confirmation switch (step n6). If the cancel switch is pressed at the step n5, the CPU 34 causes the sound storage portion to output a sound such as "Sorry. Could you play some time later." (step n7), and the coin is returned from the coin return port 32 (step n8).

If the confirmation switch is not pressed at the step n6, the procedure returns to the step n4.

When it is judged that there is no remaining number "1" at the step n3, or when the confirmation switch is pressed at the step n6, the sound of notifying the start of the game and explaining the way of operation is outputted (step n9).

In the sound output, an explanation is made which indicates that the crane is operated to take desired prizes 3 and to put them on the first prize mount stand 5 and the second prize mount stand 6 in sequence, and the prizes 3 in the prize exhibit portion 2 can be agitated before these operations.

When the CPU 34 judges that the agitation switch is pressed (step n10), the agitation means driving portion 39 is driven for a previously set predetermined time to mix the prizes 3 (step n11).

In the case where the agitation switch is not pressed at the step n10, it is judged whether or not the confirmation switch as the indication of player's intention that agitation may not be performed is pressed (step n12), and in the case where it is pressed, the procedure proceeds to the step n11, and in the case where it is not pressed, the procedure returns to the step n9.

Subsequently, the output of sound (step n13) urges the player to operate the crane to take desired prizes.

If the CPU 34 judges that the switch for operating the crane is pressed (step n14), the CPU drives the crane driving portion 40 to drive the crane in accordance with the instructions of the operation switches 11*a* (step n15).

At the step n14, in the case where the crane switch is not pressed, after a suitable time is clocked (step n16), the sound is outputted (step n17) to urge the player to operate the crane.

When the first mount confirmation sensor 14 detects the prize 3 on the first prize mount stand 5 (step n18), the crane is returned to a predetermined position, and the driving of the crane driving portion 40 is stopped. If the prize 3 is not detected at the step n18, the sound is outputted (step n19) to cause the player to again operate the crane.

When the prize 3 is detected at the step n18, the CPU 34 operates the ID tag reading device 16 to read the ID tag 3*a* of the prize 3 (step n20), and the read result is stored in the RAM 36 (step n21).

Subsequently, the result is displayed on the first display unit 9 (step n22), and the result is notified by sound output to urge the player to perform a next operation (step n23).

In the case where the specification display unit 30 is attached, it is appropriate that at this stage, the specification is displayed (step n24), and the contents are outputted by the sound (step n25). Differently from the case where it is displayed in advance, a rough acquisition probability can be first known at this point, so that a sense of expectation to the game can be felt, or unexpected luck can be tasted.

Thereafter, similarly to the steps n10 to n23, the procedure proceeds.

That is, in the case where the agitation switch is pressed (step n26), the CPU 34 drives the agitation means driving portion 39 for a previously set predetermined time to mix the prizes 3 (step n27).

In the case where the agitation switch is not pressed at the step n26, it is judged whether or not the confirmation switch as the indication of payer's intention that agitation may not be performed is pressed (step n28), and in the case where it is pressed, the procedure proceeds to the step n27, and in the case where it is not pressed, the procedure returns to the step n23.

Subsequently, the sound output (step n29) is made to urge the player to operate the crane to take the desired prize 3.

When the switch for operating the crane is pressed (step n30), the CPU 34 drives the crane driving portion 40 to drive the crane in accordance with the instructions of the operation switches 11*a* (step n31).

In the case where the crane switch is not pressed at the step n30, after a suitable time is clocked (step n32), the sound is outputted (step n33) to urge the player to operate the crane.

When the second mount confirmation sensor 15 detects the prize 3 on the second prize mount stand 6 (step n34), the crane is returned to the predetermined position, and the driving of the crane driving portion 40 is stopped. If the prize is not detected at the step n34, the sound is outputted (step n35) to cause the player to again operate the crane.

If the prize 3 is detected at the step n34, the CPU 34 operates the ID tag reading device 16 to read the ID tag 3*a* of the prize 3 (step n36), and the read result is stored in the RAM 36 (step n37). The result is displayed on the second display unit 10 (step n38), and the result is notified by the sound output (step n39).

Thereafter, the CPU 34 performs a comparison processing of the identification mark of the prize 3 of the first prize mount stand 5 stored in the RAM 36 and the identification mark of the prize 3 of the second prize mount stand 6 (step n40). It is judged whether or not the identification marks are identical to each other (step n41), and if identical, "O" is displayed on the one display support 29*a* of the result display unit 29 (step n42), and the sound of "Congratulation" or the like and the effect sound are outputted (step n43). Subsequently, the motor 25 is driven (step n44), and the two prizes 3, 3 are simultaneously released to the prize takeout port 7.

On the other hand, in the case where it is judged that the identification marks are not identical to each other at the step n41, as shown in FIG. 1, "X" is displayed on the other display unit support 29*b* of the result display unit 29 (step n45), and the sound of "It's too bad." or the like and the effect sound are outputted (step n46). Subsequently, the solenoid 23 for driving the distributing plate 24 is driven (step n47), and the motor 25 is driven (step n48), so that the two prizes 3, 3 are collected in the collection box 22.

As described above, the game machine 1 is made to have the game characteristic in that the two desired prizes 3, 3 are selected, and the prizes 3, 3 can be acquired according to whether the identification marks written in the prizes 3, 3 in a state where they can not be known from the appearance are identical to each other. Moreover, since the way of selecting the prizes in such that they can be selected by the operation of the crane among the prizes 3 piled up, even if they can be seized without fail, a desired one can not be always taken according to the way of the operation of the crane, and the game characteristic also exists in this point. If successful, the two prizes 3, 3 can be simultaneously acquired, so that the pleasure of the player is doubled. Like this, the conventional prize acquisition game machine becomes the game machine 1 having multiple game characteristics.

Further, only the prizes 3 provided with the ID tags 3*a* having arbitrary identification marks can be contained in the prize exhibit portion 2, there is no case where one unsuitable for the game machine 1 is entered as the prize, and the reliability of the game machine 1 can be ensured.

Incidentally, the judgement means of the invention corresponds to the CPU 34 including the processing mechanism of the step n41 in the embodiment, the control portion corresponds to the CPU 34, and the prize release means corresponds to the solenoid 23, the distributing plate 24 and the motor 25.

As described above, according to the present invention, the reliability of the prize acquisition game machine can be ensured, and the game machine having the new game characteristic can be obtained.

What is claimed as new and desired to be protected by Letters Patent of the United States is:

1. A game machine for acquiring exhibited prizes comprising:

a prize exhibit portion for exhibiting a plurality of prizes each having a machine readable arbitrary identification marks;

a prize selection means for selecting a desired prize from the prize exhibit portion;

a reading device for reading the identification mark of the prize selected by the prize selection means;

a judgement means for comparing and judging whether or not the identification mark of the prize selected by the prize selection means has a predetermined relation to a set value; and a control portion for driving prize release means in a case where a judgement result of the judgement means is the predetermined relation, to release plural prizes selected by the prize selection means.

2. A game machine according to claim 1, further comprising an agitation means for agitating the prizes in the prize exhibit portion in the vicinity of the prize exhibit portion.

3. A game machine according to claim 1 or 2, further comprising:

a prize mount stand on which the one prize selected by the prize selection means is mounted, and a display unit for displaying the identification mark read by the reading device in the vicinity of the prize mount stand.

4. A game machine according to claim 2, further comprising a result display unit for displaying the judgement result of the judgement means.

5. A game machine according to claim 3, further comprising a result display unit for displaying the judgement result of the judgement means.

6. A game machine according claim 1, further comprising a result display unit for displaying the judgement result of the judgement means.

7. A game machine for acquiring exhibited prizes comprising:

a container, said container having an open top side and sufficient volume to hold a plurality of prizes each having a machine readable identification mark;

a plurality of prize mount stands, each of said prize mount stands for holding and controllably discharging one of the plurality of prizes place upon said prize mount stand, each of said prize mount stands further comprising, a sensor for reading machine readable identification marks; and a controllable release mechanism for discharging prizes;

a prize selector for selecting one of said plurality of prizes and transporting said one of said plurality of prizes to one of said plurality of prize mount stands;

a controller for permitting a user to operate said prize selector and for reading the identification marks of the prizes place upon the plurality of prize mount stands, wherein said controller causes the release mechanism of at least one of said plurality of prize mount stands to discharge said prizes place upon said at least one of prize mount stands when a predetermined relationship of identification marks read by each of said prize mount stands is satisfied.

8. The game machine of claim 7, further comprising:

an agitator for mixing said plurality of prizes within said container.

9. The game machine of claim 7, wherein each of said plurality of prize mount stands further comprises a display unit for displaying the identification mark of a prize placed on said price mount stand.

10. The game machine of claim 7, wherein said controller further comprises a display unit.

11. A method for operating a game machine comprising the steps of:

selecting a first selected prize from a plurality of prizes from a container, each of said prizes including a machine readable ID code;

transporting said first selected prize from said container to a first prize holder;

reading a first ID code from said first selected prize;

selecting a second selected prize from said plurality of prizes in said container;

transporting said second selected prize from said container to a second prize holder;

reading a second ID code from said second selected prize;

discharging said first selected prize and said second selected prize if said first ID code and said second ID code satisfy a predetermined relationship.

12. The method of claim 11, further comprising:

mixing the plurality of prizes in said container.

13. The method of claim 11, further comprising:

displaying said first ID code; and displaying said second ID code.

* * * * *